June 25, 1946.    D. M. SMITH    2,402,783
PISTON PACKING
Filed Jan. 6, 1940
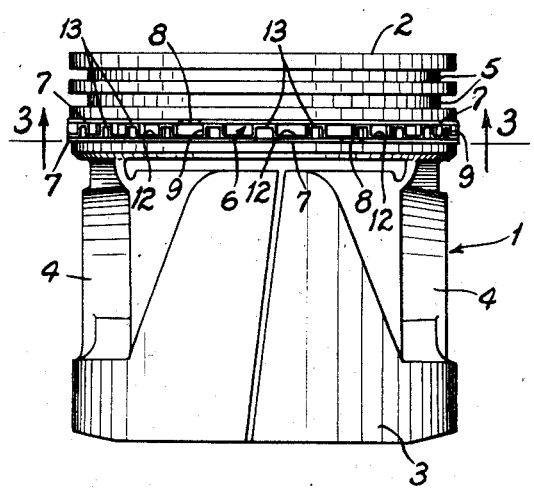
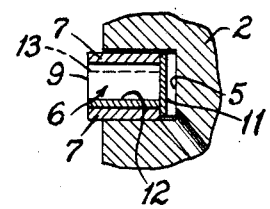
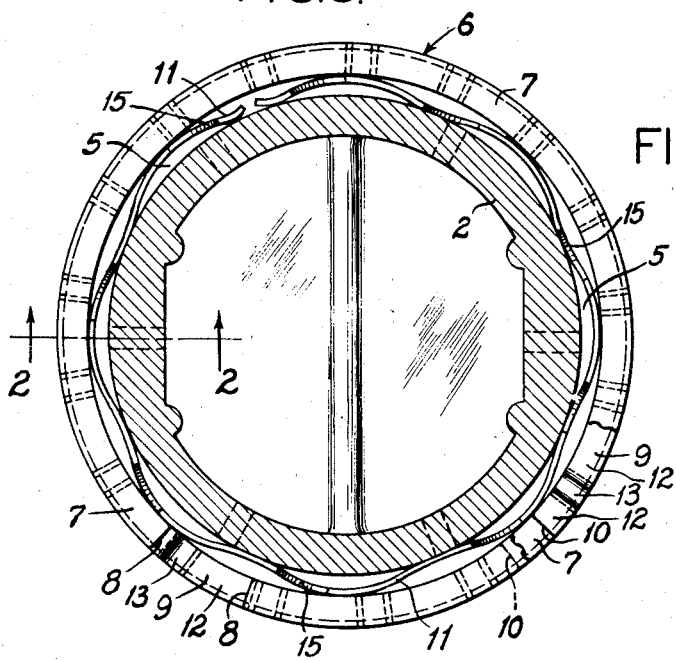
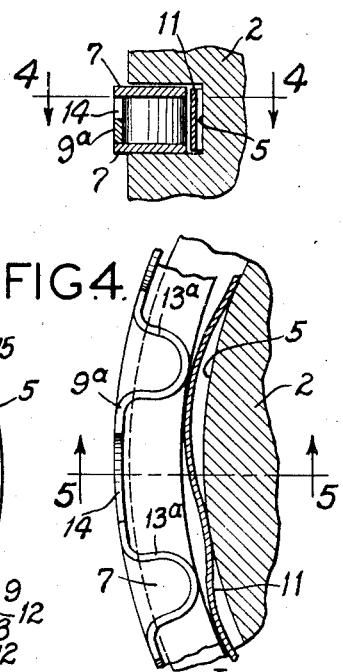
INVENTOR:
DALLAS M. SMITH
BY *J Henry Kinsley*
ATTORNEY Patented June 25, 1946

2,402,783

UNITED STATES PATENT OFFICE 2,402,783

PISTON PACKING

Dallas M. Smith, Kirkwood, Mo., assignor to McQuay-Norris Manufacturing Company, St. Louis, Mo., a corporation of Delaware Application January 6, 1940, Serial No. 312,756

6 Claims. (Cl. 309—45)

My invention relates to piston packings and more particularly to multi-piece piston packings adapted to provide an effective seal between the piston and the wall of the cylinder in which it reciprocates.

A piston packing constructed according to my invention comprises a plurality of narrow ring members formed of ribbon steel and adapted to contact the wall of the cylinder in which the piston packing is used. Positioned between the bottom of the ring groove and contacting the inner faces of the ring members is a sinuous expander also formed of ribbon steel and adapted to exert radial pressure on the ring members to insure removal of an adequate amount of oil from the cylinder wall as the ring members pass thereover. Between each pair of ring members is provided a spacer arranged to separate the members from each other.

In its broadest concept my invention contemplates a spacer formed of ribbon steel wherein the ribbon is bent and arranged to form a spacer having an effective cross-sectional area much greater than the cross-sectional area of the ribbon itself from which the spacer is formed.

In its narrower concepts, my invention includes a sinuous spacer shaped to provide flat portions and U-shaped portions therebetween and arranged and positioned so that the broad surfaces thereof contact the ring members. Also, my invention includes a spacer generally circular in shape having at intervals inwardly curved U-shaped portions arranged edgewise between the members so that only the edges thereof contact the members.

A piston packing constructed according to my invention, as briefly described above, is cheap to manufacture, since all the constituent members are formed of ribbon steel and the only operation required in forming the members is to bend the ribbon steel to the proper shape. Also, a piston packing of this kind is adapted particularly for use as an oil ring because the space between the ring members practically is unobstructed, as the effective area of the spacer is not occupied entirely by the ribbon steel of which it is formed, and oil, therefore, can flow freely between the ring members.

One object of my invention, therefore, is to provide a multiple-piece piston packing which may be used as an oil ring.

Another object of my invention is to provide a piston packing formed entirely of ribbon steel.

A more specific object of my invention is to provide a multiple-piece piston packing which is cheap to manufacture and will provide an effective seal between the piston and the cylinder in which it reciprocates.

Other objects and advantages will be apparent to those skilled in the art from the following descriptions wherein reference is made to the drawing illustrating several preferred embodiments of my invention and wherein similar reference numerals designate similar parts throughout the several views.

Several embodiments of my invention are shown in the drawing wherein

Fig. 1 shows a piston provided with a piston packing constructed according to my invention.

Fig. 2 is a detail section thereof.

Fig. 3 is a horizontal section on the line 3—3 of Fig. 1.

Fig. 4 is a horizontal section on the line 4—4 of Fig. 5 showing a second embodiment of my invention, and Fig. 5 is a vertical section on the line 5—5 of Fig. 4.

Referring to the figures a piston 1 is shown therein comprising a head 2, a skirt 3, wrist pin bosses 4 and ring grooves 5. The piston, however, may be of any desired kind and constitutes no part of my invention, since the piston is shown here for illustrative purposes only.

As shown in Fig. 1, a ring groove 5 of the piston 1 is provided with a piston packing 6 constructed according to my invention and comprised of a pair of narrow ring members 7 formed of ribbon steel and adapted to contact the cylinder wall. The ring members 7 each have a gap 8 therein so that the ring members may expand and contract to follow irregularities in the cylinder wall as the piston reciprocates in the cylinder and the ring members pass thereover. Positioned between the inner faces of the ring members 7 and the bottom of the ring groove 5 is a sinuous expander 11 formed of ribbon steel and adapted to exert pressure on the ring members 7 so that the members in turn exert a high pressure on the cylinder wall. If the piston packing 6 is to be used as an oil ring, the expander 11 preferably has passages 15 therein to permit oil to flow therethrough and into the interior of the piston 1 through ports therein provided for that purpose.

Positioned between the ring members 7 is a sinuous spacer 9 formed of ribbon steel and arranged to separate the ring members from each other. A gap 10 is provided between the ends of the spacer 9 so that it may expand and contract freely with the ring members.

In some instances it may be expedient to form the spacer so that it is naturally resilient radially and so that the spacer contacts the cylinder wall. The spacer shown in Figs. 1, 2 and 3 is adapted particularly to this construction, since the outer periphery thereof is substantially equidistant from the axis of the spacer. In that embodiment, the spacer 9 is sinuous in form and is constructed of flat portions 12 and substantially square U-shaped portions 13 positioned between adjacent flat portions. The flat portions 12 are arranged to contact one ring member and the U-shaped portions 13 are arranged to contact the other ring member. The spacer preferably is designed to have no axial resiliency or compressibility and, for this reason, the U-shaped portions 13 are shaped and arranged as shown in Fig. 1. In the embodiment shown in Figs. 4 and 5, the spacer 9ᵃ is generally circular in shape and has at intervals short inwardly bent U-shaped portions 13ᵃ. The spacer 9ᵃ is arranged edge-wise between the ring members 7 so that only the lateral edges of the spacer contact the ring members. If the piston packing of this embodiment is used as an oil ring the spacer 9ᵃ is provided with a plurality of passages 14 preferably positioned in the substantially circular portion between the adjacent inwardly U-shaped portions 13ᵃ.

Other arrangements may be used without deviating from the scope of my invention, and while I have described several embodiments, it is evident that these constructions may be varied in many particulars, and I do not limit myself to the forms and arrangements shown and described. For instance, a piston packing constructed according to my invention may comprise more than two ring members 7 and each pair of ring members may be separated by a spacer 9, as described above. Also, to come within the scope of my invention it is not necessary that the spacer be shaped exactly as shown in the several embodiments, as any desired shape may be used so long as the effective cross-sectional area of the spacer is greater than the cross-sectional area of the ribbon itself. For instance, the U-shaped portions 13ᵃ of Figs. 4 and 5 may be curved outwardly if desired.

In the embodiment shown in Figs. 1, 2 and 3, the spacer 9 is arranged between the ring members 7 so that the U-shaped portions 13 contact the upper ring member 7, that is, the ring member remote from the crank shaft. However, although this is a preferred embodiment, the spacer may be arranged between the ring members 7 so that the U-shaped portions 13 contact only the lower ring members. Also, the spacer may or may not contact the cylinder wall and, when in contact therewith, the spacer removes oil therefrom.

What I claim as new and desire to secure by Letters Patent, is:

1. A piston packing comprising a pair of narrow resilient ring members formed of ribbon steel and arranged to contact the wall of the cylinder in which said packing is used, and a spacer positioned between said members and arranged to separate said members from each other, said spacer being formed of ribbon steel and being shaped to provide flat portions and substantially square rigid U-shaped portions therebetween, said spacer being of such length that when compressed in a ring groove the ends of the spacer are free of abutment.

2. A piston packing comprising a pair of resilient ring members formed of ribbon steel and arranged to contact the wall of the cylinder in which said packing is used, a sinuous expander formed of ribbon steel and adapted to exert pressure on said ring members, a spacer positioned between said ring members and arranged to separate said members from each other, said spacer being formed of ribbon steel and being shaped to provide flat portions and substantially square rigid U-shaped connecting portions therebetween, and said flat portions being arranged to contact one of said ring members and said U-shaped portions being arranged to contact the other of said ring members, said spacer being of such length that when compressed in a ring groove the ends of the spacer are free of abutment.

3. A spacer for use in a piston packing and adapted to maintain a pair of ring members in predetermined position in the ring groove of a piston, said spacer being formed of a single piece of ribbon material bent flatwise to sinuous shape to form horizontal portions and vertical portions arranged alternately, said horizontal portions being positioned in staggered formation and said spacer being rigid axially thereof, said spacer being of such length that when compressed in a ring groove the ends of the spacer are free of abutment.

4. A piston packing comprising a pair of narrow resilient ring members formed of ribbon steel and arranged to engage the wall of the cylinder in which said packing is used, a spacer adapted to maintain said ring members in predetermined position in the ring groove of a piston, said spacer being formed of a single piece of ribbon material bent flatwise to sinuous shape to form horizontal portions and vertical portions arranged alternately, the horizontal portions being arranged in staggered formation, said spacer being rigid axially and being of such length so that when said spacer is compressed in a ring groove of a piston the ends of said spacer are free of abutment, and said spacer being arranged to engage the cylinder wall and being adapted to expand and contract radially to follow irregularities therein.

5. A spacer for use in piston packing and adapted to maintain piston rings in predetermined position in a piston ring groove, said spacer being formed of ribbon steel and being shaped to provide flat portions and substantially square rigid U-shaped portions therebetween.

6. A spacer for use in a piston packing and adapted to maintain a pair of ring members in predetermined position in the ring groove of a piston, said spacer being formed of a single piece of ribbon material bent flatwise to sinuous shape to form horizontal portions and vertical portions arranged alternately, said horizontal portions being positioned in staggered formation and said spacer being rigid axially thereof, said spacer being of such length that when compressed in a ring groove the ends of the spacer are free of abutment.

DALLAS M. SMITH.

Certificate of Correction

Patent No. 2,402,783.

June 25, 1946.

DALLAS M. SMITH

It is hereby certified that errors appear in the printed specification of the above numbered patent requiring correction as follows: Column 4, line 30, claim 3, after "thereof" strike out the comma and insert instead a period; same line 30, beginning with the words "said spacer", second occurrence, strike out all to and including the word and period "abutment." in line 33, same claim; and that the said Letters Patent should be read with these corrections therein that the same may conform to the record of the case in the Patent Office.

Signed and sealed this 17th day of September, A. D. 1946.

[SEAL]

LESLIE FRAZER,
*First Assistant Commissioner of Patents.*